US012812505B2

(12) United States Patent
Cheng et al.

(10) Patent No.: US 12,812,505 B2
(45) Date of Patent: Nov. 24, 2026

(54) SOFTWARE-ENABLED ACCESS POINTS IDENTIFICATION

(71) Applicant: Hewlett-Packard Development Company, L.P., Spring, TX (US)

(72) Inventors: Chao-Yo Cheng, Taipei City (TW); Chung-Chun Chen, Taipei City (TW); Yi-Jin Li, Taipei City (TW); Zong-Hua Wu, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 348 days.

(21) Appl. No.: 18/502,319

(22) Filed: Nov. 6, 2023

(65) Prior Publication Data

US 2025/0150935 A1 May 8, 2025

(51) Int. Cl.
*H04W 40/24* (2009.01)
*H04W 40/04* (2009.01)

(52) U.S. Cl.
CPC ......... *H04W 40/246* (2013.01); *H04W 40/04* (2013.01)

(58) Field of Classification Search
CPC ............................ H04W 40/246; H04W 40/04
See application file for complete search history.

(56) References Cited

U.S. PATENT DOCUMENTS

| | | | | |
|---|---|---|---|---|
| 10,431,217 B2 | | 10/2019 | Torok et al. | |
| 2005/0078624 A1 | | 4/2005 | Shu et al. | |
| 2011/0249622 A1* | | 10/2011 | Takeda | H04W 48/20 370/328 |
| 2015/0304922 A1* | | 10/2015 | Baboescu | H04W 36/1446 370/331 |
| 2016/0021007 A1* | | 1/2016 | Shuman | H04W 76/23 370/235 |
| 2016/0255533 A1* | | 9/2016 | Sirotkin | H04W 48/16 370/230 |
| 2017/0070543 A1* | | 3/2017 | Balasubramanian | H04W 8/082 |
| 2017/0094581 A1* | | 3/2017 | Sun | H04W 12/06 |
| 2018/0233136 A1* | | 8/2018 | Torok | G10L 15/22 |
| 2018/0343200 A1* | | 11/2018 | Jana | H04L 43/0876 |
| 2019/0069234 A1* | | 2/2019 | Neelakandan | H04W 48/16 |
| 2019/0373464 A1* | | 12/2019 | Chari | H04W 4/00 |
| 2020/0196191 A1* | | 6/2020 | Deparisse | H04L 43/16 |
| 2021/0068014 A1* | | 3/2021 | Siraj | H04W 36/0088 |
| 2022/0400500 A1* | | 12/2022 | Xia | H04W 72/1268 |

(Continued)

FOREIGN PATENT DOCUMENTS

CN 112188592 A 1/2021

*Primary Examiner* — Shah M Rahman
(74) *Attorney, Agent, or Firm* — Quarles & Brady LLP

(57) ABSTRACT

A host device acting as a wireless hotspot can suffer poor network performance when many client devices are connected simultaneously, particularly devices with a poor connection speed. To improve network performance, the host device can identify a client device with the worst network connectivity based on wireless signal strength, a peer-to-peer (P2P) packet drop rate, and a P2P ping response time, and instruct the client device to scan the other client devices to identify the best candidate to serve as a new host device for the client device. The hotspot functionality can then be offloaded to the new host device with respect to the client device, thereby reducing the number of client devices connected directly to the main host device and improving the network performance of the client device.

20 Claims, 10 Drawing Sheets

(56) References Cited

U.S. PATENT DOCUMENTS

| | | | | |
|---|---|---|---|---|
| 2023/0137826 | A1* | 5/2023 | Ajami | H04L 5/0055 370/329 |
| 2023/0247522 | A1 | 8/2023 | Hu et al. | |
| 2024/0015203 | A1* | 1/2024 | Sabella | H04L 47/762 |
| 2024/0015585 | A1* | 1/2024 | Li | H04W 40/02 |

* cited by examiner

SOFTWARE-ENABLED ACCESS POINTS IDENTIFICATION

BACKGROUND

Generally described, computing devices or electronic devices can be configured for wireless connectivity, such as the ability to host or connect to a wireless network. While hosting a wireless network, such devices may be referred to as wireless access points (APs) or hotspots. Examples of such electronic devices include, but are not limited to, mobile phones, tablets, base stations, network access points, customer-premises equipment (CPE), notebook or desktop computers, cameras, and wearable electronics.

DETAILED DESCRIPTION

A host electronic device acting as a wireless access point (AP), also referred to as a hotspot device, can suffer poor network performance when a large number of client electronic devices are connected to the host simultaneously, particularly devices with poor network connectivity. Examples of client devices with poor network connectivity can include devices which are distant from the host, devices with an obstructed view of the host (e.g., walls, furniture, people, or other obstructions present between the host device and client device), and devices in a noisy (i.e., congested) radio frequency (RF) environment. Scenarios resulting in poor network performance are particularly common in settings with a large number of client devices and congested RF channels, like a school or office.

Examples described herein provide a method of modifying a wireless network topology to improve network performance. The host device can identify a client device with poor network connectivity based on several indications of connection quality. The host can determine a wireless signal strength, a peer-to-peer (P2P) packet drop rate, and/or a P2P ping response time for each client device to identify a target unit with the poorest network performance among the plurality of client devices. (The target unit is targeted for offloading by the host to relieve network load caused by latency, dropped packets, or other effects of a weak connection.) The host device can instruct the target unit to enable a software-enabled access point (SoftAP) which enables the target unit to become a wireless access point of the network, and for each one of the remaining client devices scan the SoftAP and transmit results to the host for the host to identify a candidate client device to serve as a new host device (i.e., sub-host) for the target unit. The candidate client device can then receive instructions from the host device to enable its own SoftAP and to relay communication to the host device from the target unit via the wireless connection, thereby reducing the number of client devices connected directly to the host device and improving network performance for the client devices, including the target unit.

While a Wireless Access Point (WAP) is specifically made only to work as an Access Point, SoftAP is used to make a wireless client antenna work as either the Access Point, or the client. The advantage of SoftAP is the use of a regular electronic device, for example, with a client antenna and data connection as an Access Point to serve other wireless devices that do not have a data connection otherwise. The wireless devices in the vicinity of the SoftAP-enabled device, which may not have the Internet access directly, can use the Internet through the device whose SoftAP is enabled. This is called tethering.

Figure 1:
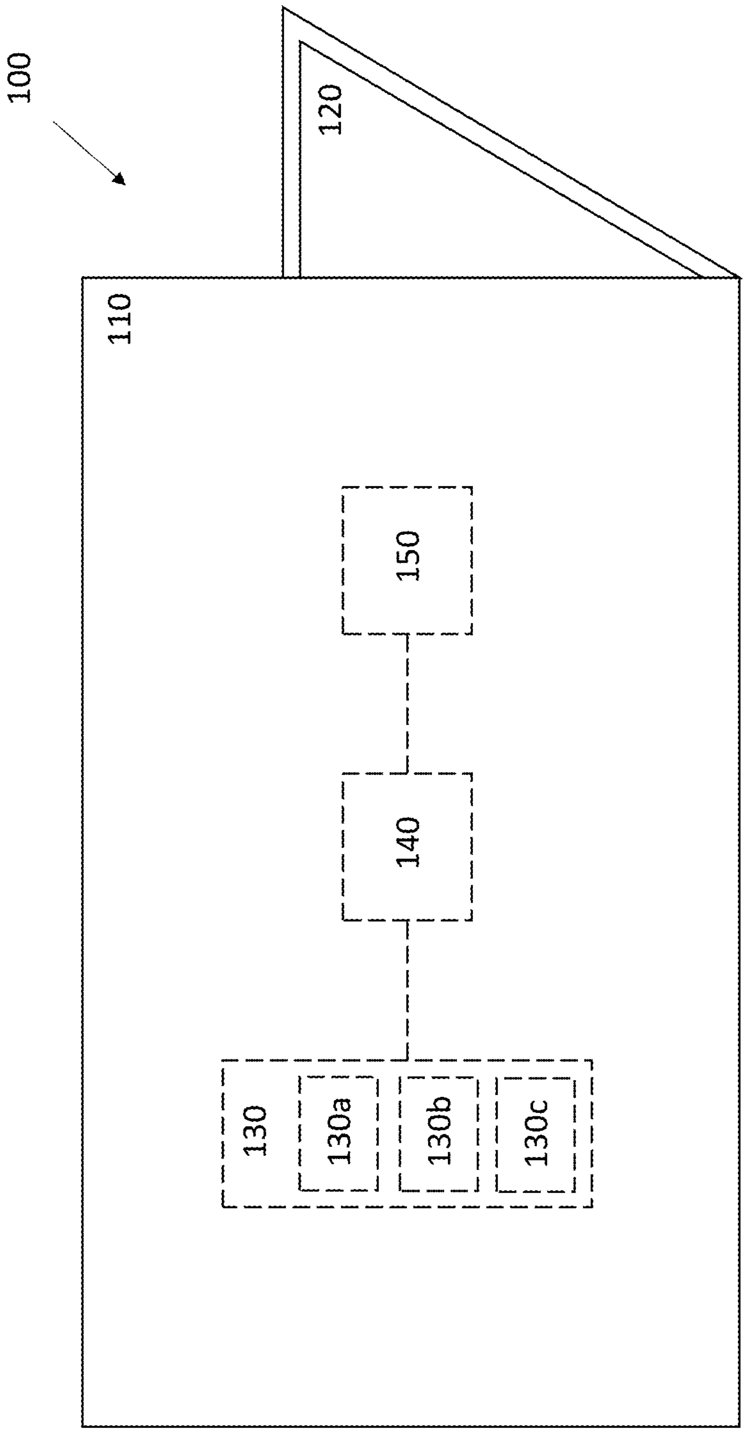
FIG. 1 is a schematic representation of an example of an electronic device configured for wireless connectivity.

Referring initially to FIG. 1, an example of an electronic device 100 configured for wireless network connectivity is schematically illustrated. The electronic device 100 is a notebook computer comprising a housing 110 and a display portion 120. The housing 110 is in a folding configuration and includes a plurality of internal hardware components, including a wireless module 130 (also referred to as an RF module), a processor 140, and a non-volatile memory 150, which are communicatively connected to each other. In certain examples, the wireless module 130 can alternatively be provided in the display portion 120 behind a display panel. In other examples, an antenna associated with the wireless module 130 can be provided inside the housing 110, the display portion 120, and/or a foldable hinge or other not-shown component of the electronic device 100.

The wireless module 130 acts as a network interface to enable wireless network access (e.g., WLAN or WWAN connectivity) for the electronic device. In general, the wireless module 130 comprises at least a transmitter 130*a*, a receiver 130*b*, and an antenna 130*d*, although various implementations are possible. (For example, the transmitter 130*a* and the receiver 130*b* may be combined into a transceiver having both TX and RX capabilities.) The wireless module 130 may include additional transmitters, receivers, transceivers, antennas, and/or filters or signal conditioning stages to enable techniques such as spread spectrum or multiple input, multiple output (MIMO) communications. The wireless module can support various wireless technologies including Wi-Fi, Bluetooth, long-term evolution (LTE), 5G New Radio (5G NR), or any other wireless technology known to those skilled in the art.

It will be appreciated that the capability of the wireless module 130 to transmit and receive enables the electronic device 100 to host a wireless network as well as to connect to one. As will be discussed herein, when certain instructions stored in the non-volatile memory 150 are executed by the processor 140, the processor 140 can cause the wireless module 130 to enable a software-enabled access point (SoftAP) functionality for hosting a wireless network. Subsequently, additional electronic devices (not necessarily the same kind of device as the electronic device 100) can connect to the SoftAP-based wireless network to share a network connection. In this scenario, the electronic device 100 may be referred to as a host device and the additional electronic devices may each be referred to as a client device.

Figure 2:
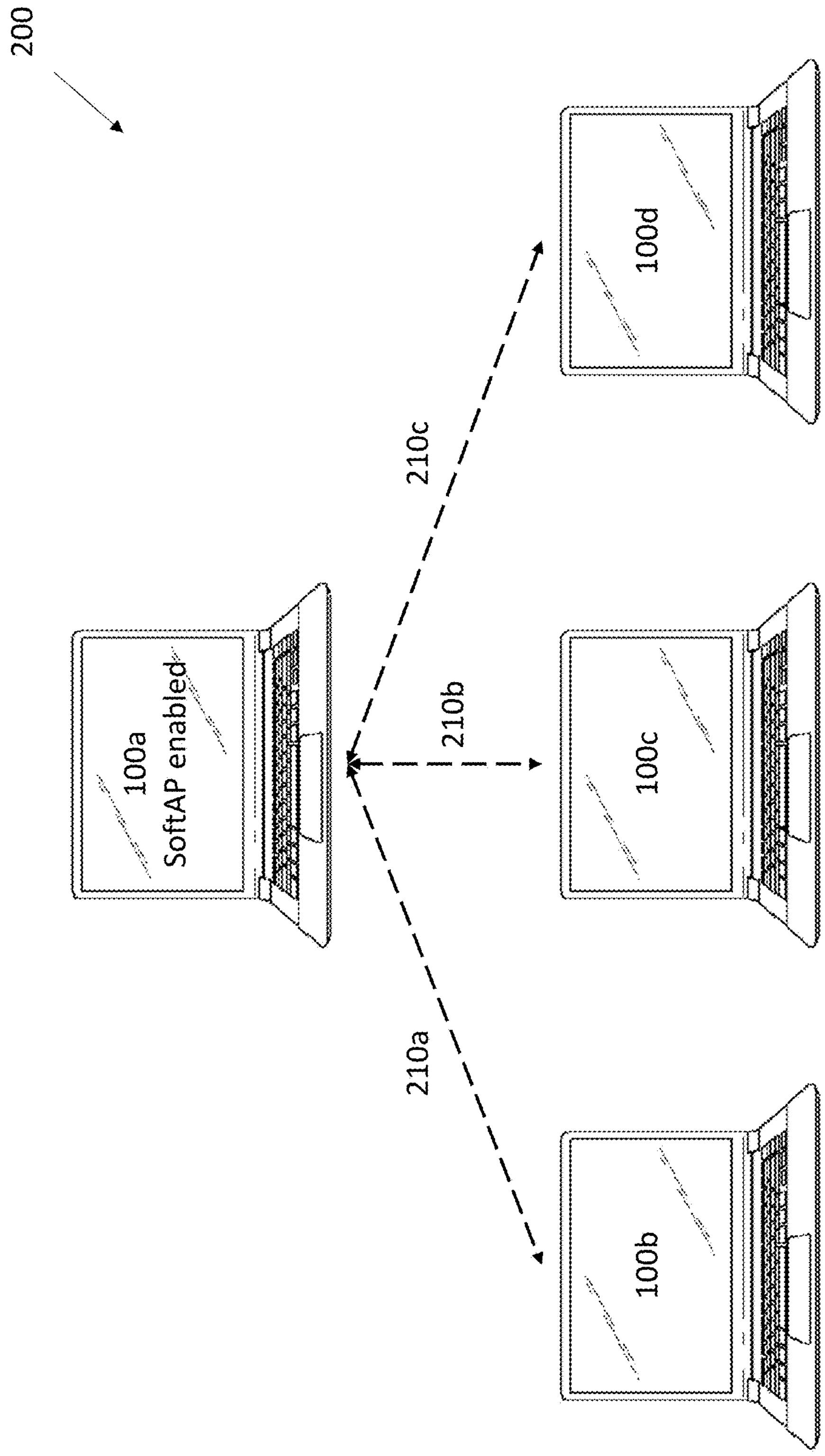
FIG. 2 is a schematic representation of an example of a wireless network hosted by an electronic device.

An example of a wireless network 200 formed by a host device 100*a* and a plurality of client devices 100*b*, 100*c*, and 100*d* is schematically illustrated by FIG. 2. (Although the host device 100*a* and the plurality of client devices 100*b-d* are illustrated as notebook computers, no limitation as to the type of devices connected to the network 200 is implied.) Because the plurality of client devices 100*b-d* are each connected directly to the host device 100*a*, the network 200 takes on a star topology.

While the star network topology can be effective for several client devices to obtain network access, the network 200 places a large load on the host device 100*a* and can become slow and increasingly unstable as more client devices are added. In particular, overall network performance may suffer when the connection between the host device 100*a* and one of the client devices 100*b-d* is compromised by long distances, obstructions, RF interference, or other factors. A poorly connected client can have a weak signal strength, increased latency, and a high rate of dropped data packets, requiring additional network resources from the host device 100*a* which negatively affects network performance for each one of the client devices 110*b-d*. Accordingly, a method of modifying the network topology can be used to improve network performance when the host device 100*a* detects one of the client devices 100*b-d* with poor connectivity.

Figure 3:
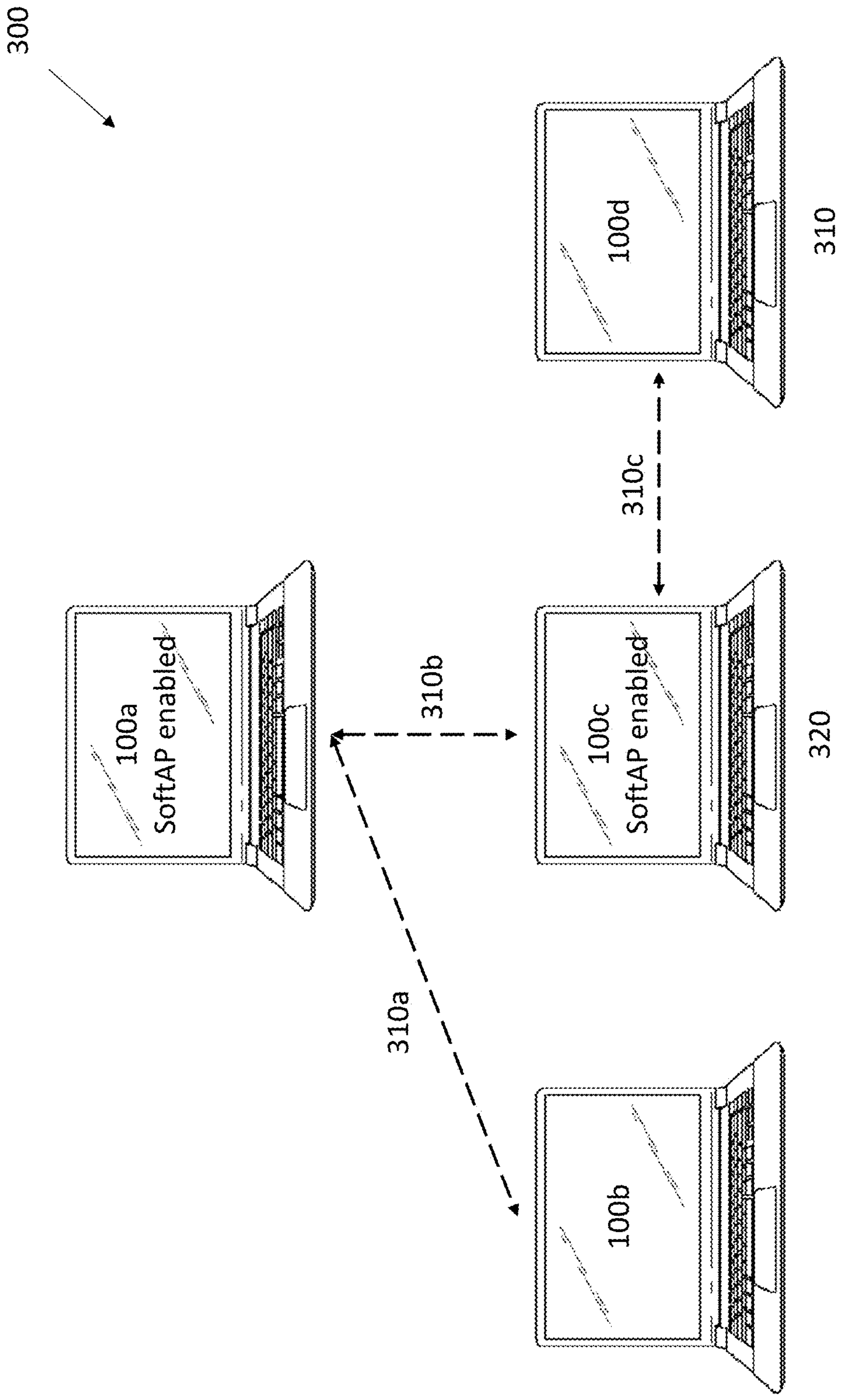
FIG. 3 is a schematic representation of an example of a wireless network hosted by a plurality of electronic devices.

FIG. 3 is a schematic representation of a wireless network 300 formed by modifying the network 200 of FIG. 2. As will be discussed herein, the method for modifying the network topology involves offloading the task of hosting a poorly-connected client device (in this example, the client device 100*d*) from the host device 100*a* to a candidate client device (in this example, the client device 100*c*) by a peer-to-peer connection. The modified network 300 has a tree topology, wherein at least one of the client devices 100*b-d* is separated from the host device 100*a* by another client device (i.e., "node" of the tree), but the host device remains as the base node of the network.

Those skilled in the art will appreciate that the network 300 has fewer direct connections to the host device 100*a* as compared to the star network 200 of the previous example while retaining the same total number of client devices 100*b-d*. This can improve overall network performance and connectivity between devices by updating the network topology based on a connectivity quality of each client device. In the example of FIG. 3, the client device 100*d* with the poorest connectivity to the host device 100*a* has been identified as a target unit 310 and its connection offloaded to another client device 100*c* operating as an intermediate host (or "sub-host") 320 via SoftAP functionality. The sub-host device 320 is to receive network access from the host device 100*a* while relaying network communications between the target unit 310 and the host device 100*a*, providing a bridge between the host device 100*a* and the target unit.

Figure 4:
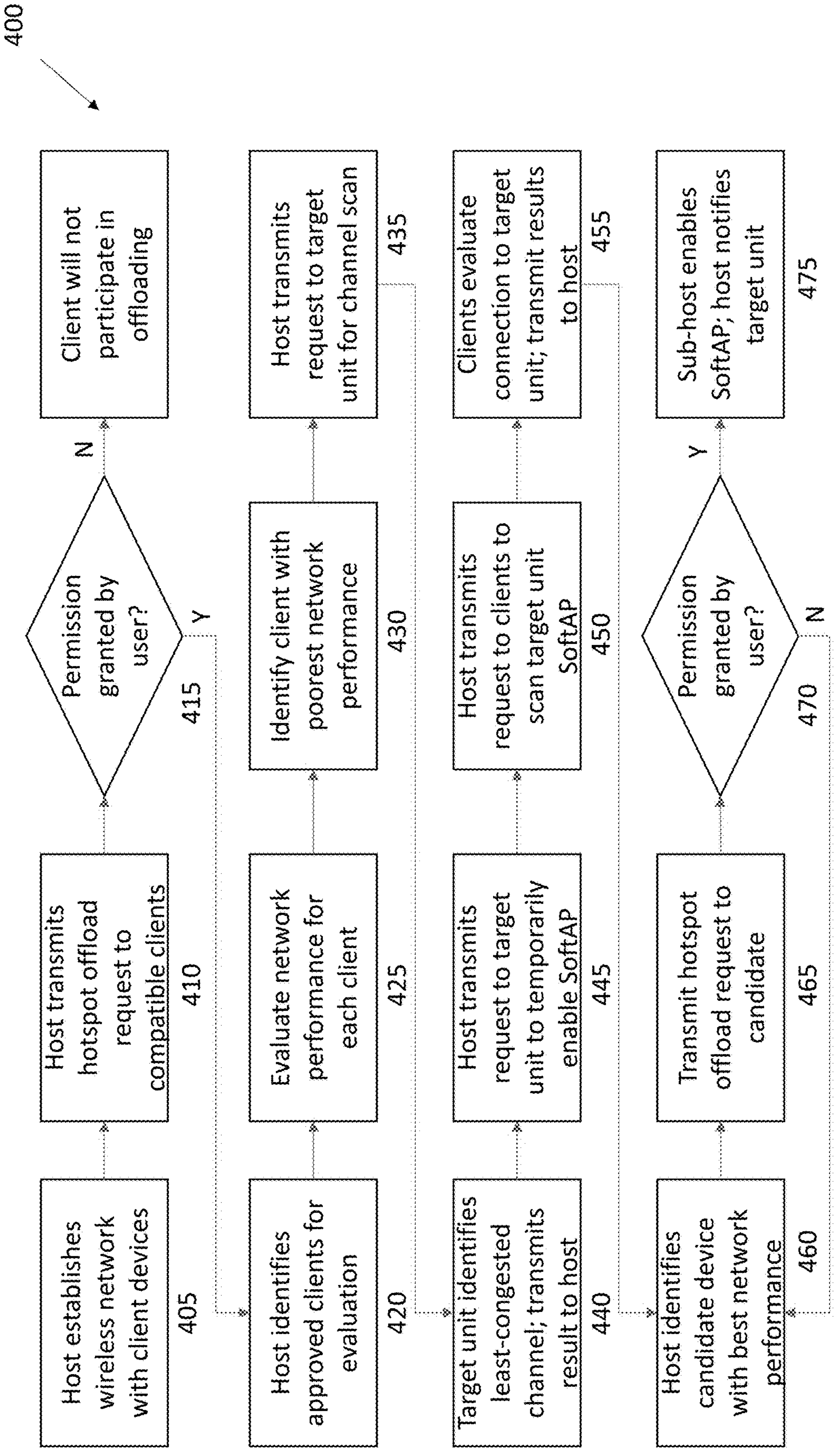
FIG. 4 illustrates a method for modifying a wireless network topology.

Referring now to FIG. 4, a method 400 for modifying a wireless network topology is schematically illustrated. The method 400 may be carried out, for example, by a host device and/or a client device described herein (or in a distributed manner). For example, one or more steps of the method 400 may be carried out by a computing device (e.g., laptop) having a hardware processor and non-transitory physical computer storage storing instructions that, when executed by the hardware processor, cause the hardware processor to perform the steps.

At block 405, the host device 100*a* establishes an initial network (e.g., the star network 200) as client devices 100*b-d* connect to the host. The host device 100*a* operates as a first SoftAP to communicate with the client devices 100*b-d*. Establishing the network can occur over an extended period of time as additional client devices are added or dropped from the initial network. The host device 100*a* can monitor several indications of connectivity quality and overall network performance to determine when to proceed with modifying the network topology. For example, the host device 100*a* can monitor a received signal strength indicator (RSSI), a peer-to-peer ping response time (i.e. a time-of-flight delay), and/or a peer-to-peer packet drop rate of each client device 100*b-d* to determine when modifying the network topology is necessary (e.g., when a client device has a network performance score below a threshold or otherwise qualify as target units). In other examples, the host device 100*a* can trigger modifying the network topology when it detects a rapid increase in the number of client devices, or when the number of client devices exceeds a threshold likely to impact the network performance.

At block 410, the host device 100*a* transmits a request to each one of the client devices 100*b-d* indicating its intent to offload hosting to a sub-host 320. Because only certain client devices of the plurality of client devices 100*b-d* may be compatible with the offloading, the host device 100*a* may identify a pool of eligible client devices (e.g., by MAC address, manufacturer code, serial number, or other means) to which the host will transmit the request. In other cases, the host device 100*a* can transmit the request for offloading to each one of the connected client devices 100*b-d*.

At block 415, each one of the eligible client devices (e.g., the plurality of client devices 100*b-d*) determines if permission is granted by a respective user of the device to participate in the offloading. The client devices 100*b-d* can, for example, prompt the user via a graphical user interface to accept or decline the request by the host device 100*a*. The prompt may include information about current network performance or network connectivity quality for that device. Alternatively, each client device 100*b-d* may refer to a preconfigured flag stored in the non-volatile memory 150 to determine if user permission is granted. The client devices 100*b-d* may be preconfigured to accept requests for offloading unless the user has changed the flag to automatically decline, or if offloading is disabled by administrative group policy. In some cases, the user may also be warned of poor network connectivity before attempting intensive operations such as transferring large files. Each one of the eligible client devices reports feedback to the host device 100*a* based on the user permission.

At block 420, the host device 100*a* receives the feedback from each one of the eligible client devices 100*b-d* to identify a pool of approved client devices for hosting offloading.

At block 425, the host device 100*a* evaluates network performance for each one of the approved client devices based on two or more of the aforementioned indications of connectivity quality. Evaluating network performance may be performed passively by the host device 100*a* (e.g., monitoring a received signal strength of each client device), or the host may also transmit an instruction to each of the approved client devices to participate in a network test (e.g., measuring a ping response time from the client device).

At block 430, the host device 100*a* can identify one of the approved client devices with the poorest network performance as the target unit 310 based on the results of the previous step. The host device 100*a* can calculate a weighted connectivity score based on each one of the indications of connectivity quality to identify the target unit 310. For example, the weighted connectivity score can be calculated from normalized results of the received signal strength (weighted 40%), the ping response time (weighted 30%), and the packet drop rate (weighted 30%) for each client device. In other examples, each one of the two or more indications of connectivity quality may be weighted equally to calculate the connectivity score. In yet other examples, other combinations of percentages or weights may be used to determine whether a client device qualifies as a target unit and/or to rank the client devices. The host device 100*a* may form an ordered list of the approved client devices based on their weighted connectivity scores, with the target unit 310 being identified as the client device with the lowest connectivity score. In some examples, a specific number (e.g., 1, 2, or more) or percentage (5%, 10%, or some other percentage) of worst performing client device(s) may be identified as the target unit 310 (for being connected to a new host).

At block 435, the host device 100*a* transmits a request to the target unit 310 to perform a channel scan.

At block 440, the target unit 310 performs a channel scan to identify, among a plurality of RF channels or bands, an RF channel or band having the least amount of congestion for communicating with the host device 100*a*. The channel scan may be performed passively or in cooperation with the host device 100*a*. For example, when the wireless network is a Wi-Fi network, the target unit 310 can monitor ambient RF noise levels in Wi-Fi channels 1-14 to identify a preferred channel having the least amount of RF noise and network traffic. In some cases, the host device 100*a* can also transmit a test signal to the target unit 310 over two or more RF channels or bands to assist in identifying the preferred channel. Upon identifying the preferred channel, the target unit 310 transmits the result to the host device 100*a* for future use.

At block 445, the host device 100*a* transmits a request to the target unit 310 to temporarily enable a second SoftAP. The target unit 310 subsequently enables SoftAP functionality of its wireless module 130 to allow other client devices to sense the wireless signal from the second SoftAP.

At block 450, the host device 100*a* transmits a request to each one of the approved client devices (aside from the target unit 310) instructing the approved client devices to scan the second SoftAP. The request can include information such as a MAC address or SSID of the second SoftAP, and the preferred channel of the target unit 310.

At block 455, each one of the approved client devices performs the scan, evaluates its own network performance with respect to the second SoftAP of the target unit 310, and transmits the scan result (an indication of connection quality) to the host device 100*a*. For example, the scan result may indicate the connection strengths of the approved client devices relative to the target unit 310. While the client devices passively monitor the second SoftAP, they remain connected to the first SoftAP of the host device 100*a*. In some cases, the wireless modules 130 of the client devices can be connected to the first SoftAP and the second SoftAP simultaneously. Evaluating network performance may be performed passively by the client devices (e.g., monitoring a received signal strength of the second SoftAP), or the host device 100*a* may transmit an instruction to the target unit 310 to participate in a network test (e.g., measuring a ping from the second SoftAP by each one of the approved client devices).

At block 460, the host device 100*a* identifies a candidate sub-host device 320 from the client devices having the best network performance with respect to the target unit 310. Upon receiving the indications of connectivity quality from each of the approved client devices, the host device 100*a* will generate an ordered list of candidate devices including a second weighted connectivity score for each one of the approved client devices. Once the list of candidate devices is obtained, the host device 100*a* can instruct the target unit 310 to disable the second SoftAP.

The sub-host device 320 can be selected from the list of candidate devices as the device having the highest second weighted connectivity score, indicating the strongest connection between the sub-host and the target unit 310. However, the host device 100*a* can also refer to the entire list of candidate devices in the event that the device having the highest second weighted connectivity score is not available as a sub-host 320.

At block 465, the host device 100*a* transmits a request to the device having the highest second weighted connectivity score to offload the network connection for the target unit 310 (i.e., a request to become a sub-host 320).

At block 470, the device having the highest second weighted connectivity score determines if permission is granted by the device user to participate in the offloading. The device can prompt the user via a graphical user interface to accept or decline the request by the host device 100*a*. The prompt may include information about current network performance or network connectivity quality for that device and/or information about the target unit 310. Alternatively, the device may refer to a second preconfigured flag stored in the non-volatile memory 150, or an administrative group policy to determine if permission is granted. If the user declines to participate in the offloading, the method 400 returns to block 460 and the next best candidate device is selected from the list of candidate devices as the new sub-host device 320.

Once a sub-host device 320 is selected and approved, at block 475 the sub-host device 320 enables a third SoftAP to enable the target unit 310 to connect. The host device 100*a* transmits a request to the target unit 310 to disconnect from the first SoftAP and to connect to the third SoftAP of the sub-host device 320. The sub-host device 320 is configured to provide access to the network for the target unit 310 such that a communication between the target unit 310 and the network of the host device 100*a* is routed via the first SoftAP and the third SoftAP.

FIGS. 5A-5F are schematic representations a network 500 being modified according to the method of FIG. 4. Initially, the network 500 is identical to the star network 200 of FIG. 2.

Figure 5A:
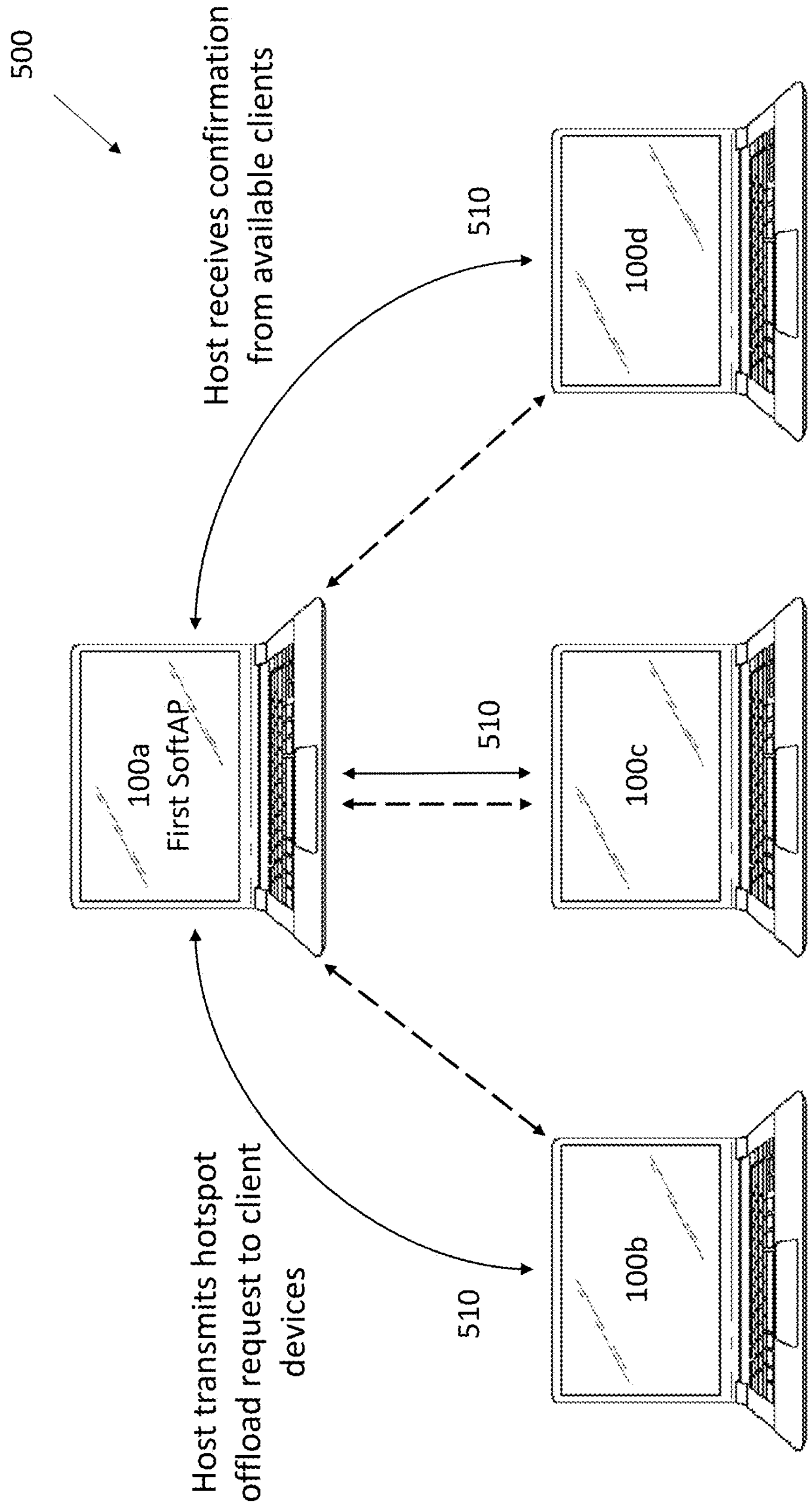
FIGS. 5A-5F are schematic representations an example of the method of FIG. 4.

FIG. 5A illustrates the host device 100*a* transmitting a request 510 to each one of the client devices 100*b-d* indicating its intent to offload hosting to a sub-host 320. The host device 100*a* receives feedback from each one of the eligible client devices 100*b-d* to identify a pool of approved client devices for hosting offloading.

Figure 5B:
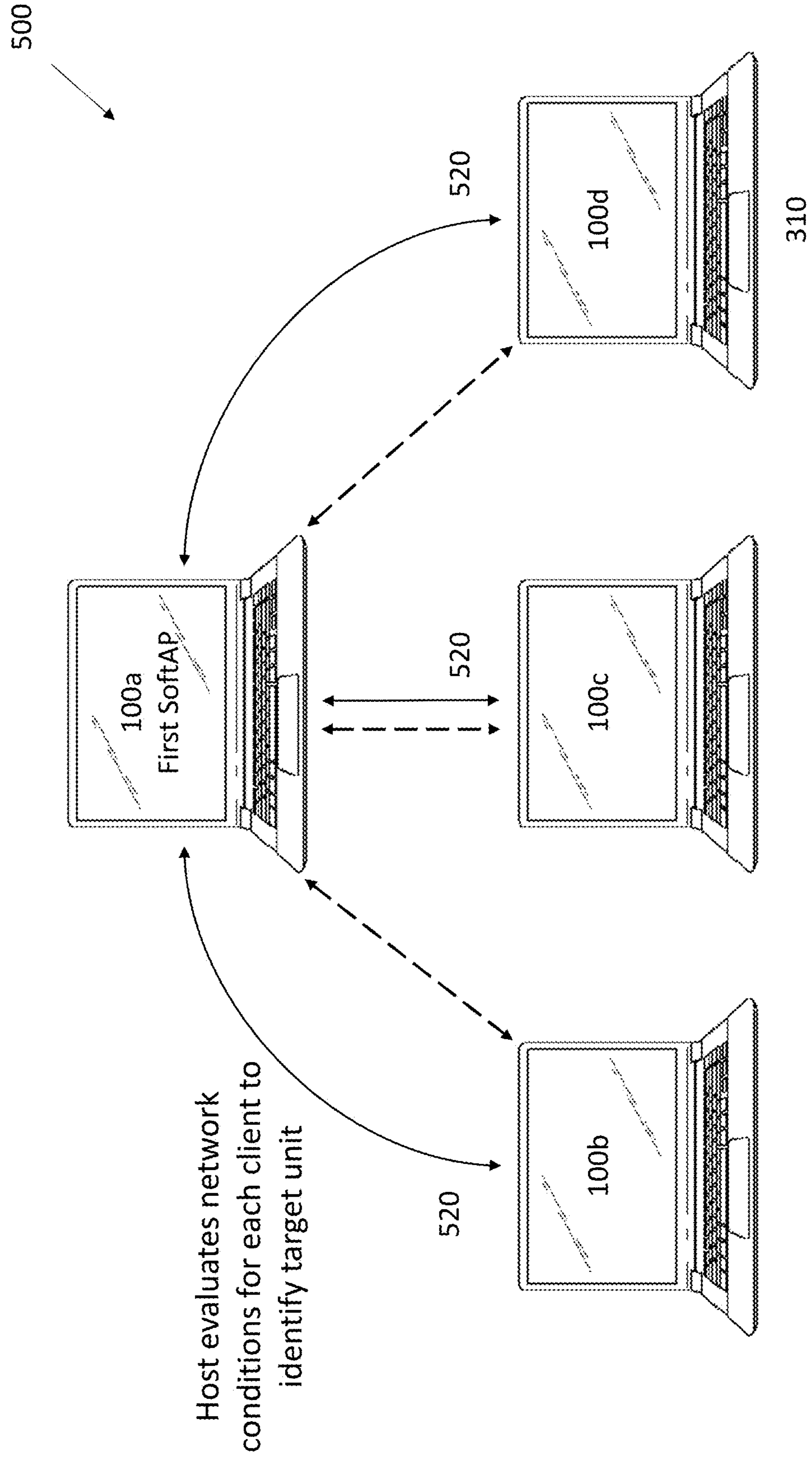

FIG. 5B illustrates the host device 100*a* evaluating the network performance 520 for each one of the approved client devices based on two or more of the aforementioned indications of connectivity quality. It will be understood that although FIGS. 5A-5F are shown with bidirectional arrows, evaluating network performance may be performed passively by the host device 100*a* (e.g., monitoring a received signal strength of each client device), or the host may transmit an instruction to each of the approved client devices to participate in a network test (e.g., measuring a ping from each client device). The host device 100*a* then identifies one client device as the target unit 310 (in this example, the client device 100*d*) based on the network performance.

Figure 5C:
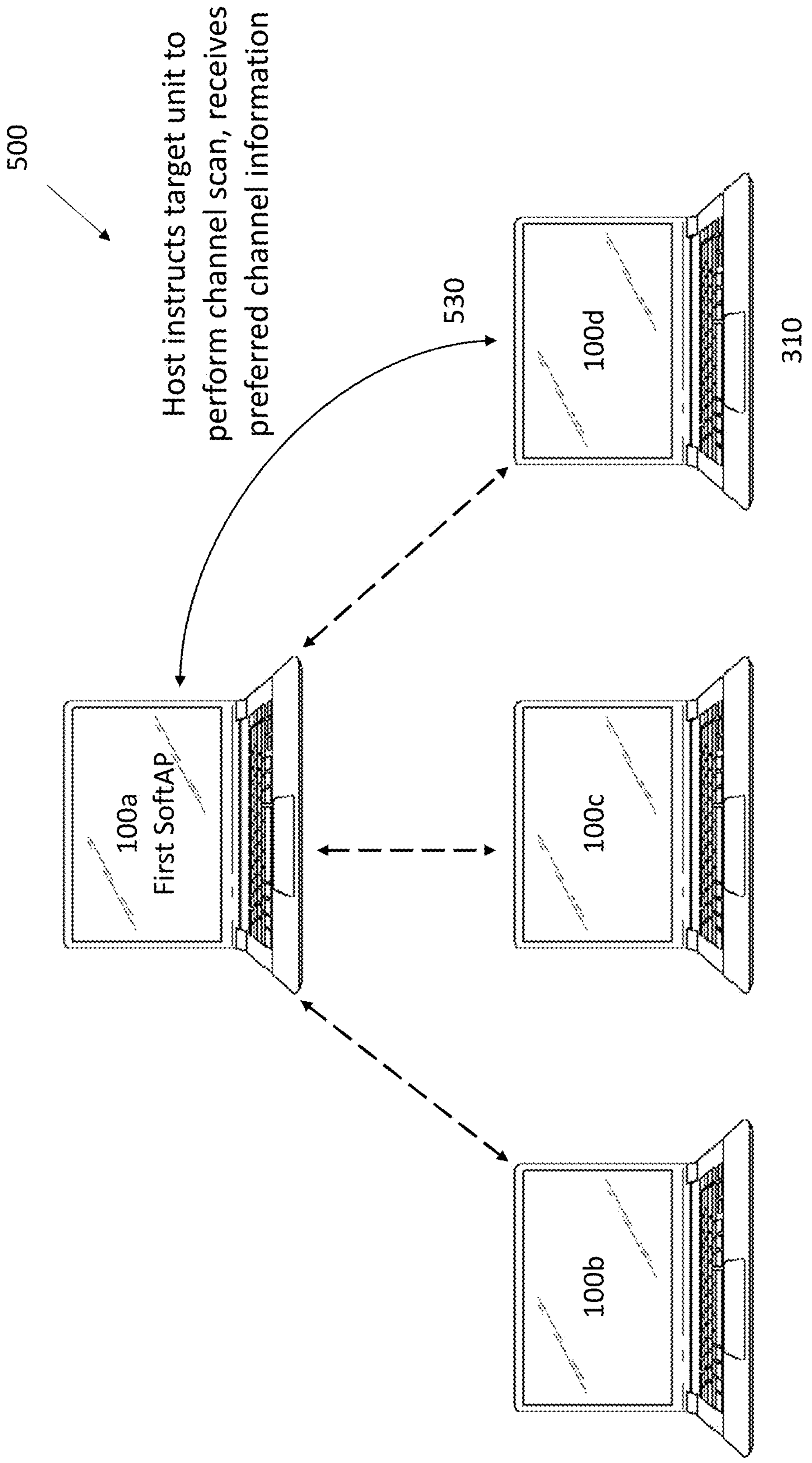

FIG. 5C illustrates the host device 100*a* transmitting a request 530 to the target unit 310 to perform a channel scan. The target unit 310 monitors ambient RF noise levels and/or network activity in several channels or bands to identify a channel with the lowest RF noise floor. The host device 100*a* may also transmit a test signal to the target unit 310 over two or more RF channels or bands to assist in identifying the preferred channel. Upon identifying the preferred channel, the target unit 310 transmits the result to the host device 100*a*.

Figure 5D:
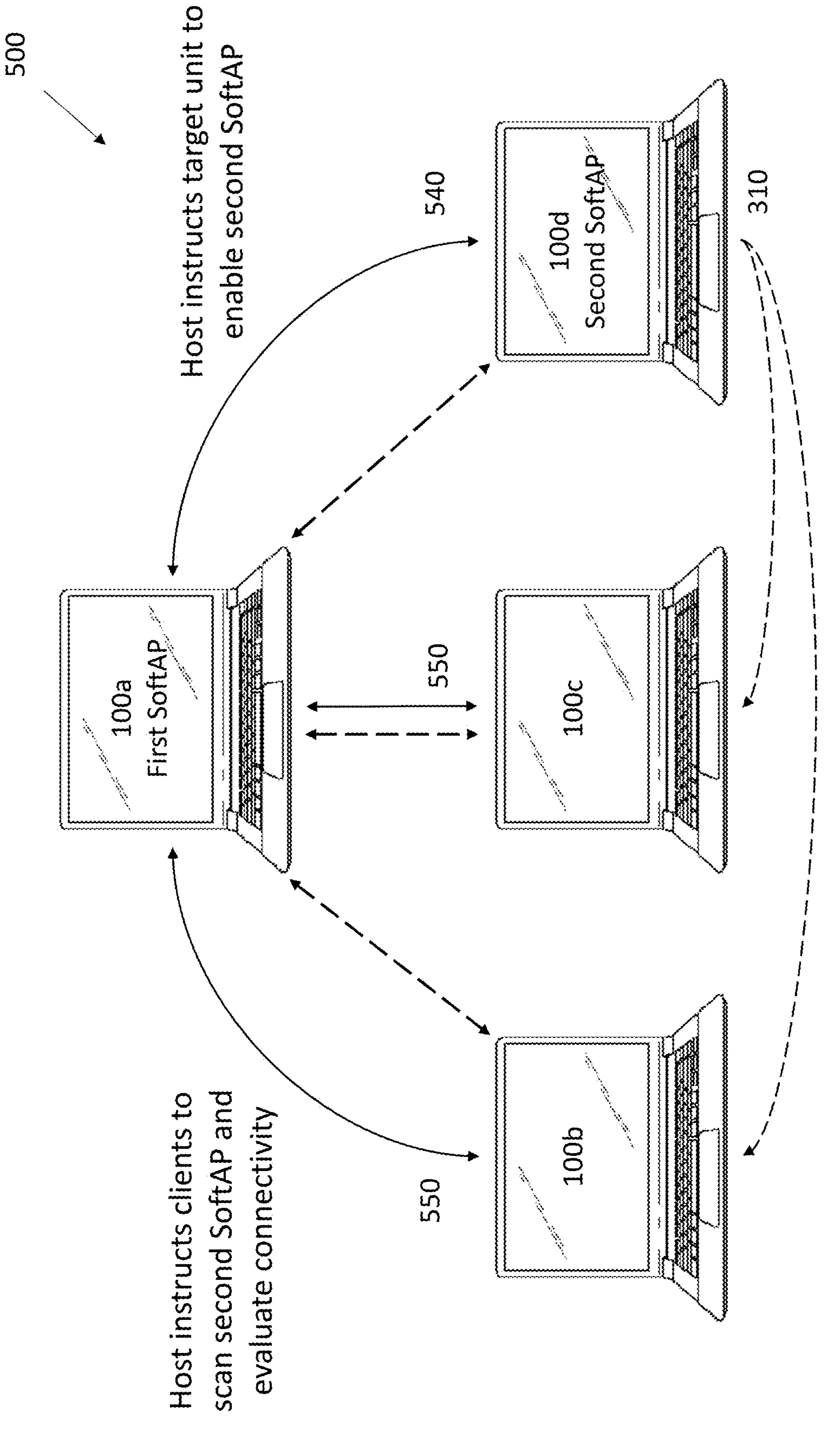

FIG. 5D illustrates the host device 100*a* transmitting a request 540 to the target unit 310 to enable the second SoftAP, and transmitting a request 550 to the other approved client devices 100*b-c* to scan the second SoftAP and evaluate network performance.

Figure 5E:
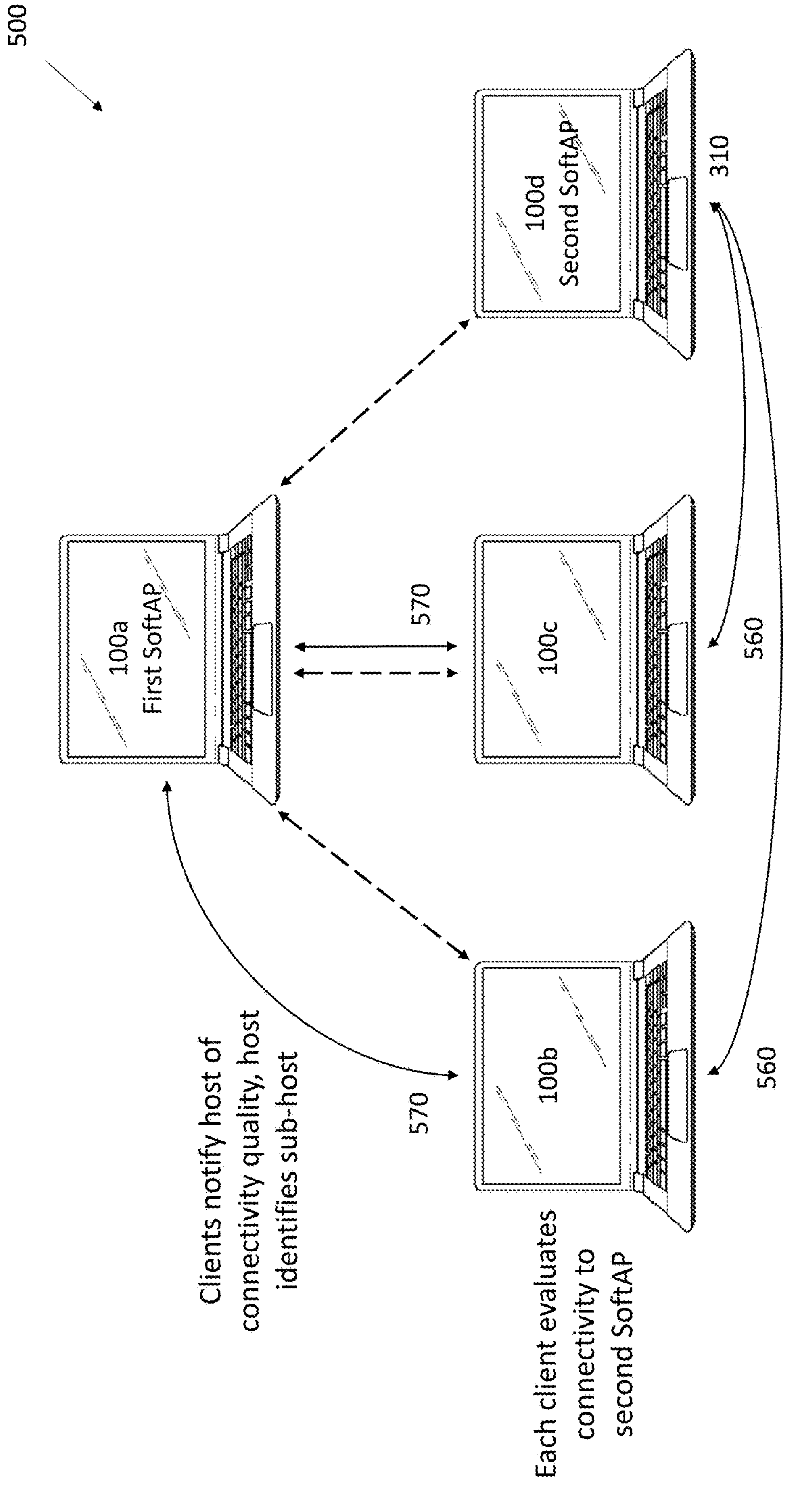

FIG. 5E illustrates each one of the approved client devices 100*b-c* evaluating network performance 560 for the target unit 310 based on two or more of the indications of connectivity quality as discussed above. Each one of the approved client devices 100*b-c* transmits a result of the network performance evaluation (e.g., a second weighted connectivity score computed from the indications of connectivity quality) to the host device 100*a*. The host device 100*a* compares the evaluation results received from each client device 100*b-c* to identify a sub-host device 320 having the best network performance with respect to the second SoftAP of the target unit 310.

Figure 5F:
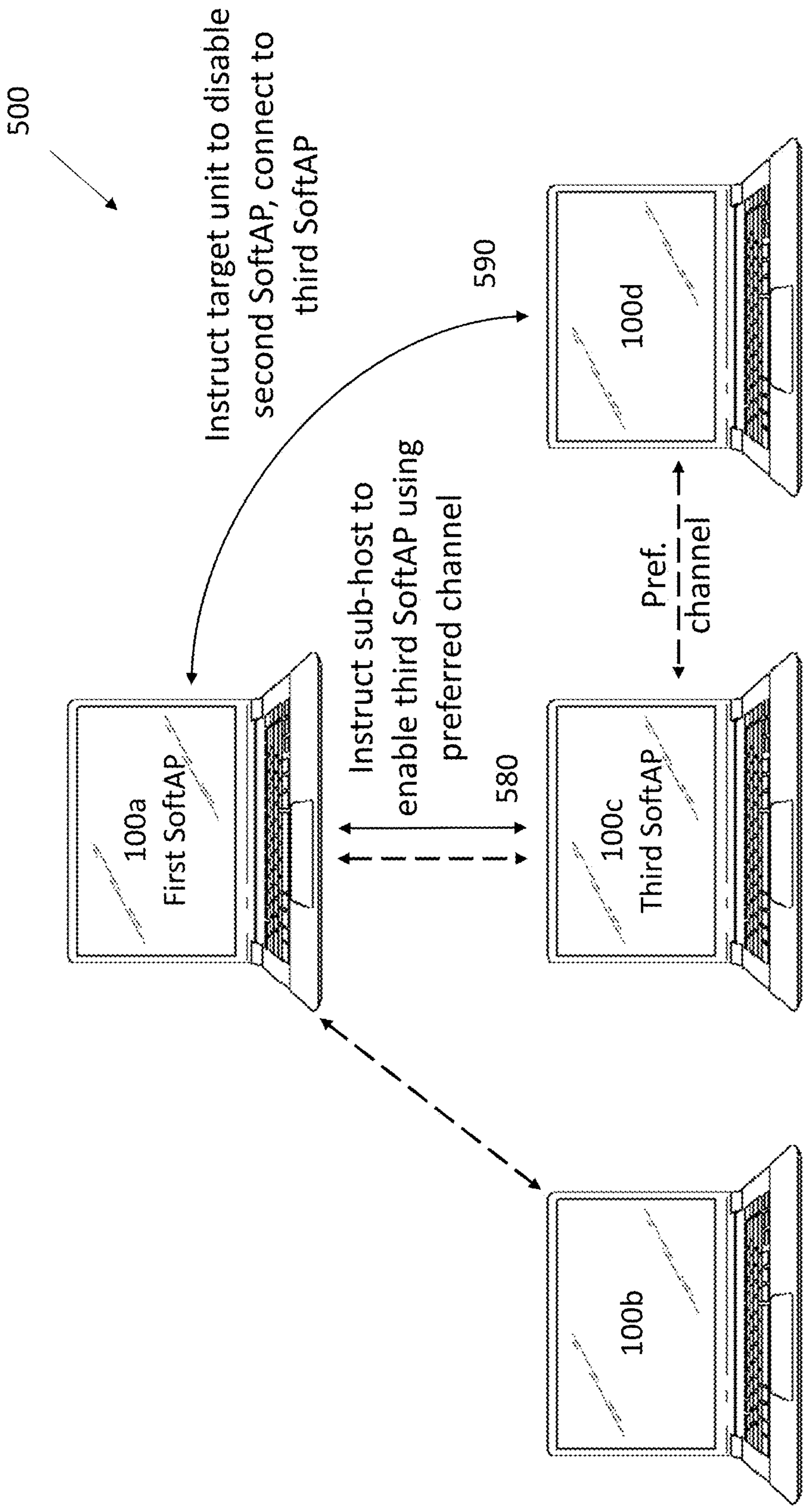

FIG. 5F illustrates the host device 100*a* transmitting a request 570, including information on the preferred channel, to the identified sub-host device 320 to enable the third SoftAP. As discussed herein, the host device 100*a* may transmit the request 570 to several available client devices based on their second weighted connectivity scores. Upon receiving confirmation from the sub-host device 320 that the third SoftAP is enabled (i.e., offloading permission has been granted by the device user), the host device 100*a* transmits a request 580 to the target unit 310 to disable the second SoftAP and to connect to the third SoftAP. Subsequent communication between the target unit 310 and the network of the host device 100*a* occurs via the preferred channel and the third SoftAP of the sub-host device 320.

Accordingly, FIGS. 5A-5F show how the method of modifying a network topology allows the network 200 having a star topology to be transformed into a network having a tree topology (e.g., the network 300 of FIG. 3). Those skilled in the art will appreciate that the method is not limited to the example networks shown herein. The method is applicable to other complex networks, and the host device 100*a* can repeatedly perform the offloading as needed to maintain network performance. After several iterations of offloading hosting, the network can have multiple branches of connected devices, including multiple sub-hosts to relay network traffic to the first SoftAP.

The principles of the examples described herein can be used for any other system or apparatus including mobile phones, tablets, base stations, network access points, customer-premises equipment (CPE), laptops, cameras, and wearable electronics.

All of the methods and tasks described herein may be performed and fully automated by a computer system. The computer system may, in some cases, include multiple distinct computers or computing devices (e.g., laptops, physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A non-transitory computer-readable medium storing instructions that, when executed by a computing device, cause the computing device to:

operate as a first software-enabled access point (SoftAP) to provide access to a network for a first client device, a second client device, and a third client device;

transmit a request to the second client device and the third client device, wherein the request is to instruct the second and third client devices to scan the first client device;

receive a scan result from the second and third client devices, wherein the scan result indicates connection strengths of the second and third client devices relative to the first client device;

identify, based on the scan result, the second client device to operate as a second SoftAP to provide access to the network for the first client device such that a communication between the first client device and the network is routed via the first SoftAP and the second SoftAP;

transmit, to the second client device, instructions to enable the second SoftAP while remaining connected to the first SoftAP;

transmit, to the first client device, instructions to connect to the second SoftAP;

transmit, to the first client device, a request to identify a preferred radio frequency (RF) channel having a least amount of congestion among a plurality of RF channels; and receive, from the first client device, an indication of the preferred RF channel.

2. The non-transitory computer-readable medium of claim 1, storing further instructions that, when executed by the computing device, cause the computing device to:

detect that a number of client devices accessing the network exceeds a network threshold; and transmit the request to the second and third client devices responsive to detecting that the number of client devices accessing the network exceeds the network threshold.

3. The non-transitory computer-readable medium of claim 1, storing further instructions that, when executed by the computing device, cause the computing device to:

evaluate network performance for each one of the first client device, the second client device, and the third client device;

calculate a first weighted connectivity score for each client device based on normalized indications of connectivity quality; and identify the first client device as a client device having a lowest first weighted connectivity score.

4. The non-transitory computer-readable medium of claim 3, wherein the normalized indications of connectivity quality include:

a received signal strength indicator (RSSI);

a peer-to-peer (P2P) ping response time; and a P2P packet drop rate.

5. The non-transitory computer-readable medium of claim 4, wherein the first weighted connectivity score is calculated based on normalized weights of:

40% for the RSSI;

30% for the P2P ping response time; and

30% for the P2P packet drop rate.

6. The non-transitory computer-readable medium of claim 1, wherein the instructions, when executed by the computing device, cause the computing device to receive the scan result from the second and third client devices as a second weighted connectivity score based on indications of connectivity quality relative to the first client device.

7. The non-transitory computer-readable medium of claim 1, wherein the instructions, when executed by the computing device, cause the computing device to transmit, to the second client device, the instructions to enable the second SoftAP such that the second SoftAP operates in the preferred RF channel.

8. The non-transitory computer-readable medium of claim 4, wherein:

the first weighted connectivity score is calculated based on a first normalized weight for the RSSI, a second normalized weight for the P2P ping response time, and a third normalized weight for the P2P packet drop rate; and the first normalized weight is different from the second normalized weight.

9. The non-transitory computer-readable medium of claim 8, wherein the first normalized weight is greater than the second normalized weight.

10. The non-transitory computer-readable medium of claim 9, wherein the first normalized weight is different from the third normalized weight.

11. The non-transitory computer-readable medium of claim 10, wherein the first normalized weight is greater than the third normalized weight.

12. The non-transitory computer-readable medium of claim 11, wherein the second normalized weight is equal to the third normalized weight.

13. A computing device, comprising:

memory; and a processor to:

operate the computing device as a first software-enabled access point (SoftAP) to provide access to a network for a first client device, a second client device, and a third client device;

transmit a first request to the first client device, the first request instructing the first client device to scan the third client device;

receive a first scan result from the first client device, the first scan result being indicative of a first connection strength between the first client device and the third client device;

transmit a second request to the second client device, the second request instructing the second client device to scan the third client device;

receive a second scan result from the second client device, the second scan result being indicative of a second connection strength between the second client device and the third client device;

calculate a first weighted connectivity score for the first client device based on a first received signal strength indicator (RSSI), a first peer-to-peer (P2P) ping response time, and a first P2P packet drop rate included in the first scan result;

calculate a second weighted connectivity score for the second client device based on a second RSSI, a second P2P ping response time, and a second P2P packet drop rate included in the second scan result;

determine that the first client device should operate as a second SoftAP responsive to determining that the first weighted connectivity score is greater than the second weighted connectivity score; and transmit an instruction to the first client device to cause the first client device to operate as the second SoftAP to provide access to the network for the third client device such that communications between the third client device and the network are routed via the first SoftAP and the second SoftAP.

14. The computing device of claim 13, wherein the processor is to:

detect that a number of client devices accessing the network exceeds a network threshold;

transmit the first request to the first client device responsive to detecting that the number of client devices accessing the network exceeds the network threshold; and transmit the second request to the second client device responsive to detecting that the number of client devices accessing the network exceeds the network threshold.

15. The computing device of claim 13, wherein the processor is to transmit a second instruction to the third client device to cause the third client device to connect to the second SoftAP.

16. The computing device of claim 13, wherein the processor is to:

transmit a third request to the third client device, the third request instructing the third client device to share a preferred radio frequency (RF) channel associated with the third client device;

receive an indication of the preferred RF channel from the third client device; and transmit the instruction to the first client device such that the instruction causes the first client device to operate as the second SoftAP in the preferred RF channel associated with the third client device.

17. A method performed by a computing device, the method comprising:

operating the computing device as a first software-enabled access point (SoftAP) to provide access to a network for a first client device, a second client device, and a third client device;

transmitting a first request to the first client device, the first request instructing the first client device to scan the third client device;

receiving a first scan result from the first client device, the first scan result being indicative of a first connection strength between the first client device and the third client device;

transmitting a second request to the second client device, the second request instructing the second client device to scan the third client device;

receiving a second scan result from the second client device, the second scan result being indicative of a second connection strength between the second client device and the third client device;

determining, based on the first scan result and the second scan result, that the first client device should operate as a second SoftAP;

transmitting a third request to the third client device, the third request instructing the third client device to share a preferred radio frequency (RF) channel associated with the third client device;

receiving an indication of the preferred RF channel from the third client device; and transmitting an instruction to the first client device to cause the first client device to operate as the second SoftAP in the preferred RF channel associated with the third client device to provide access to the network for the third client device such that communications between the third client device and the network are routed via the first SoftAP and the second SoftAP.

18. The method of claim 17, comprising:

detecting that a number of client devices accessing the network exceeds a network threshold;

transmitting the first request to the first client device responsive to detecting that the number of client devices accessing the network exceeds the network threshold; and transmitting the second request to the second client device responsive to detecting that the number of client devices accessing the network exceeds the network threshold.

19. The method of claim 17, comprising:

calculating a first weighted connectivity score for the first client device based on the first scan result;

calculating a second weighted connectivity score for the second client device based on the second scan result; and determining that the first client device should operate as the second SoftAP responsive to determining that the first weighted connectivity score is greater than the second weighted connectivity score.

20. The method of claim 19, comprising:

calculating the first weighted connectivity score based on a first received signal strength indicator (RSSI), a first peer-to-peer (P2P) ping response time, and a first P2P packet drop rate included in the first scan result; and calculating the second weighted connectivity score based on a second RSSI, a second P2P ping response time, and a second P2P packet drop rate included in the second scan result.

* * * * *